United States Patent [19]

Kreher et al.

[11] Patent Number: 5,097,582
[45] Date of Patent: Mar. 24, 1992

[54] APPARATUS FOR THE EXACT POSITIONING AND FASTENING OF SEVERAL PARTS ONTO A HOLLOW BODY

[75] Inventors: Peter-Jürgen Kreher, Essen-Bredeney; Miroslan Podhorsky, Ratingen, both of Fed. Rep. of Germany

[73] Assignee: Balcke-Dürr Aktiengesellschaft, Ratingen, Fed. Rep. of Germany

[21] Appl. No.: 572,856

[22] Filed: Aug. 24, 1990

[30] Foreign Application Priority Data

Aug. 24, 1989 [DE] Fed. Rep. of Germany ....... 3927896

[51] Int. Cl.$^5$ .............................................. B23Q 1/00
[52] U.S. Cl. ................................... 29/283.5; 269/48.1
[58] Field of Search ................... 29/252, 281.1, 281.5, 29/282, 283.3; 269/48.1, 48.3

[56] References Cited

U.S. PATENT DOCUMENTS

| | | | |
|---|---|---|---|
| 4,397,173 | 8/1983 | Eftefield et al. | 29/283.5 |
| 4,420,866 | 12/1983 | Mueller | 29/283.5 |
| 4,528,740 | 7/1985 | Sassak | 29/516 |
| 4,616,392 | 10/1986 | Snyder | 269/48.1 |
| 4,724,595 | 2/1988 | Snyder | 269/48.1 |
| 4,875,270 | 10/1989 | Krips et al. | 29/283.5 |

FOREIGN PATENT DOCUMENTS

| | | |
|---|---|---|
| 224747 | 7/1985 | Fed. Rep. of Germany . |
| 3720485 | 1/1989 | Fed. Rep. of Germany . |
| 3807817 | 3/1989 | Fed. Rep. of Germany . |
| 2069387 | 8/1981 | United Kingdom ............... 29/283.5 |

Primary Examiner—J. J. Hartman
Attorney, Agent, or Firm—Robert W. Becker & Associates

[57] ABSTRACT

An apparatus for the exact positioning and fastening of several parts, which have an opening, onto a hollow body, whereby, in the initial state, the opening of said parts, which are to be fastened, is larger than the dimensions of the respective fastening positions of the hollow body. Before the fastening process is carried out by hydraulically expanding the hollow body, the parts are positioned at the respective fastening positions of the hollow body by placing the parts into the depressions of a mold, which comprises at least two parts. The hydraulic fluid is introduced into the hollow body via an inlet element, which is attached to the mold. To prevent leakage of the fluid and contamination of the workpiece, there is an expandable elastic container for the hydraulic fluid, disposed at the inlet element, which adjoins to one end of the hollow body. The container is inserted into the hollow body and is held by a support on its free face. The support is arranged in said mold at the end of said hollow body opposing the inlet element (FIG. 1).

13 Claims, 3 Drawing Sheets

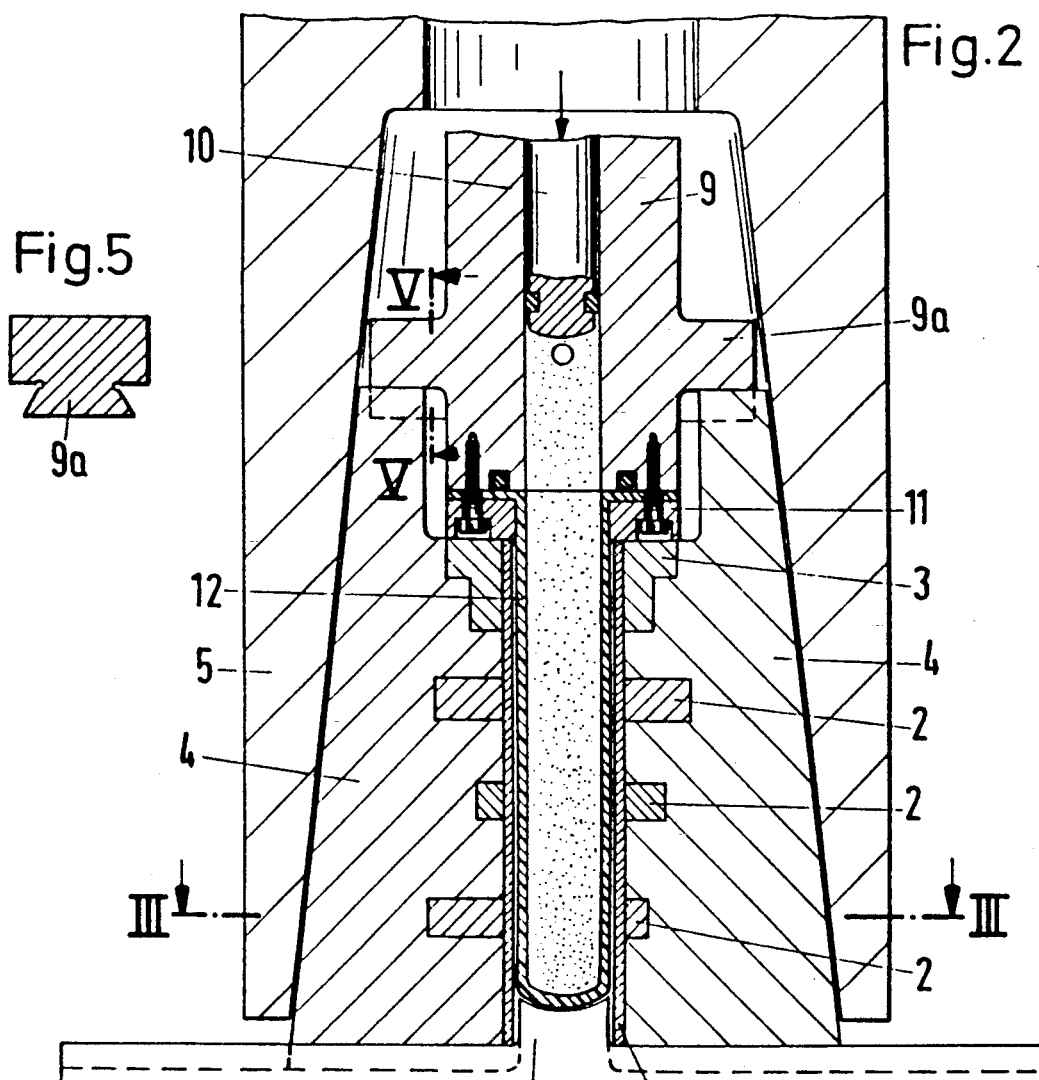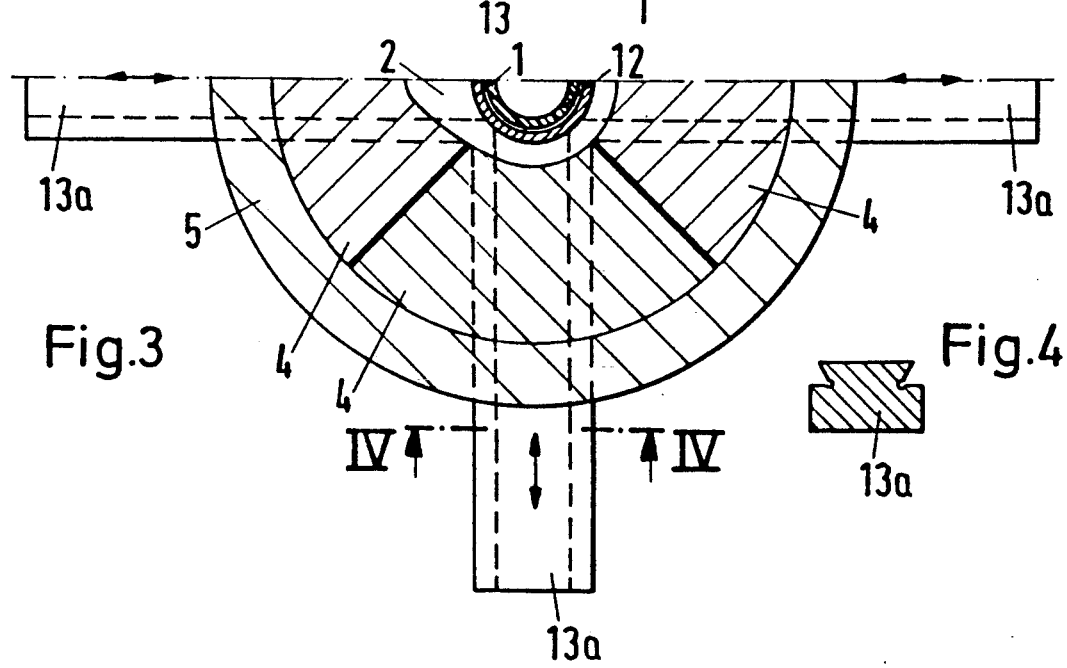

APPARATUS FOR THE EXACT POSITIONING AND FASTENING OF SEVERAL PARTS ONTO A HOLLOW BODY

BACKGROUND OF THE INVENTION

The present invention relates to an apparatus for the exact positioning and fastening of several parts, which have an opening, onto a hollow body, especially of cams and/or bearing sleeves onto a hollow shaft. In the initial state, before the fastening process, the opening of the parts, which are to be fastened, is larger than the dimensions of the respective fastening positions of the hollow body, and the parts are positioned at the respective fastening positions of the hollow body. Before the fastening process is carried out by hydraulically expanding the hollow body, at least in the region of the fastening positions, the parts are placed into the depressions of a mold, which is comprised of at least two parts, then the hollow body is positioned into the openings of the parts, and the at least two parts of the mold are aligned and held in place by an enclosing casing. The hydraulic fluid is then introduced into the hollow body via an inlet element, which is attached to the mold.

An apparatus for the exact positioning and fastening of several parts onto a hollow body, as described above, has been known from the German Pat. No. 38 07 817. In this known apparatus, the sealing between the inlet element and the mold or the hollow body is achieved by elastic gasket rings or by a conical metallic flange under a constant face pressure. Due to the very high pressures employed for the expansion of the hollow body, these sealings show a low wear-resistance and thereby cause problems.

It is therefore an object of the present invention to provide an apparatus of the aforementioned general type, with improved sealings between the inlet element and the mold or the hollow body.

BRIEF DESCRIPTION OF THE DRAWINGS

This object, and other objects and advantages of the present invention, will appear more clearly from the following specification in conjunction with the accompanying schematic drawings, in which:

FIG. 2 is a longitudinal cross-sectional view, equivalent to the view of FIG. 1, of a second embodiment;

FIG. 3 is a cross-sectional view along the line III—III in FIG. 2;

FIG. 4 is a partial cross-sectioned view along the line IV—IV in FIG. 3; and

FIG. 5 is a partial cross-sectioned view along the line V—V in FIG. 2; and

SUMMARY OF THE INVENTION

The apparatus of the present invention is primarily characterized in that an expandable elastic container is disposed at the inlet element, attached to one end of the hollow body. Said container, which contains the hydraulic fluid, is inserted into the hollow body. which is to be expanded, and is held by a support at its free face. The support is arranged in the mold at the end of the hollow body opposite the inlet element.

One advantageous feature of the present invention is avoiding the use of the wear-sensitive sealing elements and sealing surfaces. It is also advantageous, that, after the expansion process is complete, the hydraulic fluid cannot leak from the inlet element. In the known apparatus, the hydraulic fluid inside the hollow body is lost after each expansion process and contaminates the workpiece as well as the environment. The apparatus of the present invention, therefore, not only eliminates sealing problems but provides a dry expansion process despite the use of a hydraulic fluid. During the expansion process, the container, which is attached in a pressure tight manner to the face of the inlet element, is securely held by the support in order to avoid the overexpansion of the container face.

In a preferred embodiment of the invention, the support, together with the parts of the mold, is enclosed in a casing, which, after the inlet element is attached, is form-locked with the inlet element. The form-locking may be achieved by a U-shaped clamp or by a pivoting hook, attached to the inlet element or the casing.

In another preferred embodiment of the invention, the support may be form-locked with the mold, in which case the support may be equipped with lateral extensions, which form-lock to the casing. Preferably, the extensions of the support have a cross-sectional profile shaped like a dovetail. The axially separated parts of the mold have respective grooves, with which the parts of the mold may be slid onto the extensions of the support.

In order to assure the proper attachment of the inlet element to the mold, despite the strong axially acting force during the expansion process, it may be equipped with lateral extensions, which have a cross-sectional profile shaped like a dovetail. The axially separated parts of the mold have respective grooves, in which the parts of the mold may be slid onto the extensions of the inlet element.

The apparatus of the present invention also provides an expandable elastic container, which is attached in a fluid and pressure tight manner, to the inlet element by a holding collar, screwed onto the face of the inlet element. The container is preferably made of an elastomer.

DESCRIPTION OF PREFERRED EMBODIMENTS

The present invention will now be described in detail with the aid of several specific embodiments utilizing FIG. 1-6.

Figure 1:
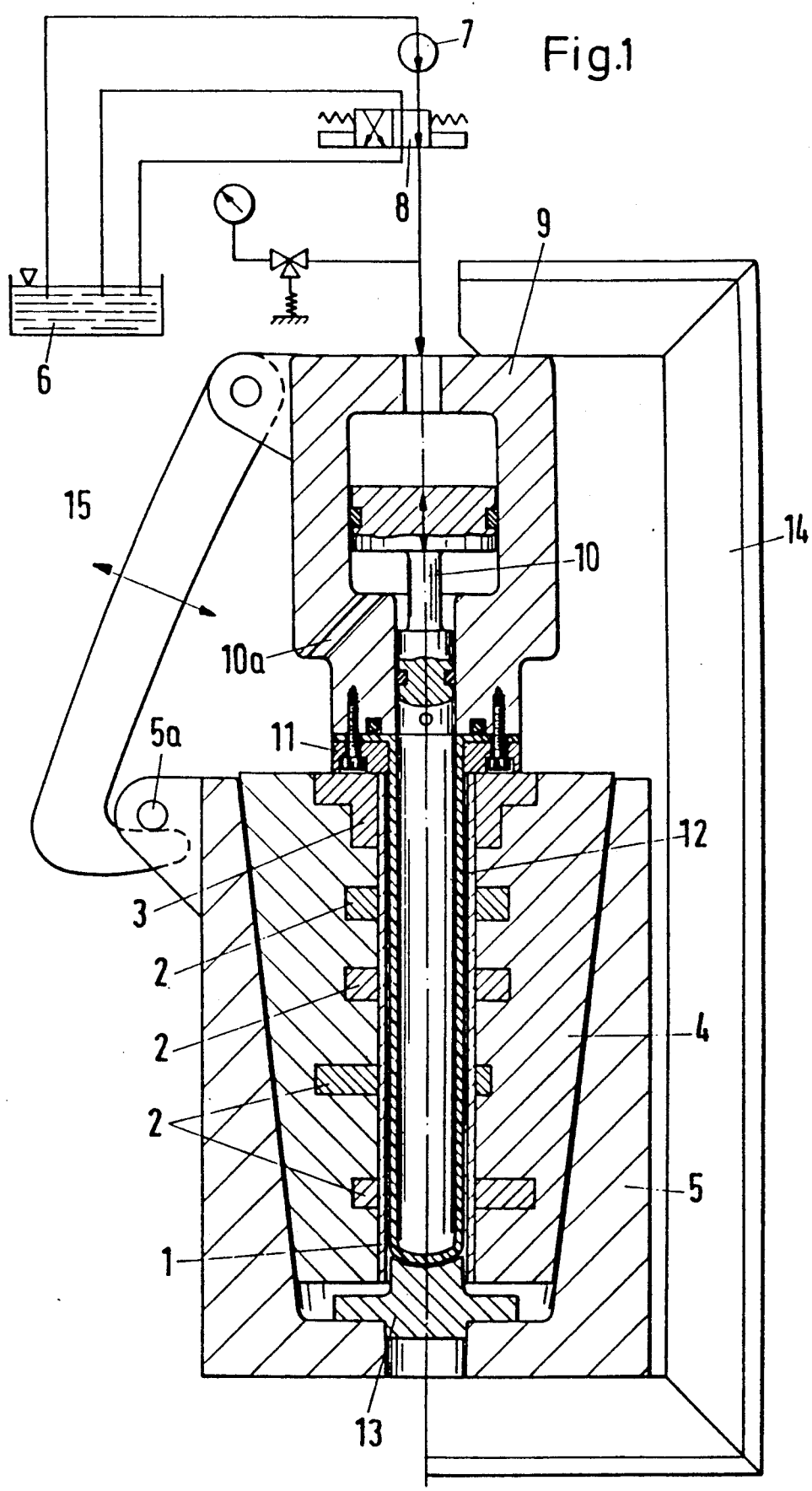
FIG. 1 is a longitudinal cross-sectional view of a first embodiment.
Figure 6:
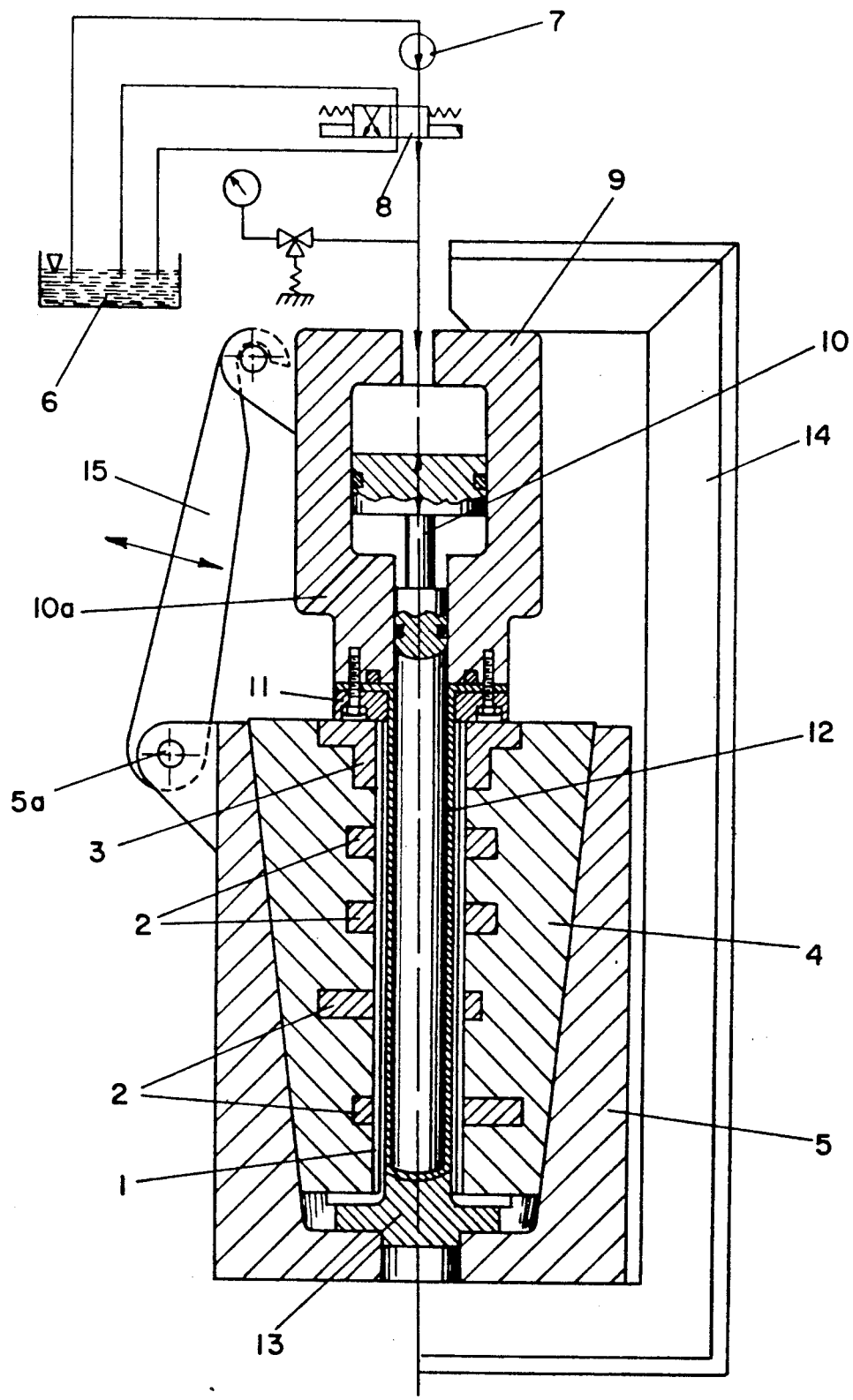
FIG. 6 is a view according to FIG. 1 showing a reversed hook arrangement.

A preferred embodiment, represented in FIG. 1, shows an apparatus for the manufacture of a cam shaft. In the initial state, the cam shaft is composed of a hollow body 1, in the form of a hollow shaft, four cams 2 and a spur gear 3. The four cams 2 and the spur gear 3 are placed into the respective depressions of a mold 4. The mold 4, in this preferred embodiment, is separated axially into two halves to allow the insertion of the cam shaft parts. After placing the cams 2 and the spur gear 3 into the mold 4 and subsequently inserting the hollow body 1 into the openings of the parts 2 and 3, which are to be fastened, the two halves of the mold 4 are held together by the casing 5, which is formed with a conical inner surface and is slipped over the respective conical outer surface of the mold 4.

In order to fasten the cams 2 and the spur gear 3 to the hollow body 1, the hollow body 1, in the area of the fastening positions of the hollow body 1 to the cams 2 and the spur gear 3, is expanded hydraulically. The walls of the hollow body 1, between the cams 2 and the spur gear 3, are supported by respective parts of the mold 4 to prevent them from expanding.

The expansion is achieved with a fluid, which is pumped, under increased pressure, from a reservoir 6 by a pump 7 via a servo valve spool 8 to the inlet element 9. In this preferred embodiment, the inlet element 9 is equipped with a transmission plunger 10 to achieve a further increase in pressure.

Onto the face of the inlet element 9, a container 12 is attached in a fluid and pressure tight manner by a holding collar. This container is elastic and expandable. It contains a hydraulic medium, which is pressurized to a high pressure by the transmission plunger 10. In order to release pressure after each expansion process, the inlet element 9 is equipped with a vent line 10a.

After the mold 4 has been closed by the casing 5, the container 12, made preferably of an elastic plastic (elastomer), is inserted into the hollow body 1. In the operating position, shown in FIG. 1, the holding collar 11 lies against the mold 4 respectively the spur gear 3. The free face of the container 12 is thereby positioned against the support 13, which supports the container 12 during the subsequent pressure increase. In the embodiment according to FIG. 1, the support 13 is arranged between the mold 4 and the casing 5.

Before the pressure is applied, the mold 4 and the casing 5 as well as the inlet element 9 are form-locked in the operating position by the U-shaped clamp 14, as shown in the right half of FIG. 1. Another form-locking embodiment is shown in the left half of FIG. 1: a pivoting hook 15, attached to the inlet element 9, hooks onto the bolt 5a, attached to the casing 5.

When, while the apparatus is positioned as represented by FIG. 1, the fluid from the reservoir 6 is moved, under pressure, onto the low pressure face of the transmission plunger 10, which has a larger surface area, the high pressure face of the transmission plunger 10. which has a smaller surface area, creates a high pressure inside the hydraulic medium in the container 12. This high pressure expands the hollow body 1, in the area of the fastening positions of the hollow body 1 to the cams 2 and the the spur gear 3, so that these parts are fastened in their exact positions onto the hollow body 1.

After loosening the clamp 14 or the hook 15 (FIGS. 1 and 6), the inlet element 9 may be removed from the mold 4, whereby the container 12 is pulled out of the expanded hollow body 1. No hydraulic medium is lost, since it is enclosed in the container 12, which is sealed against the inlet element 9. Also, the fluid, removed from the reservoir 6, which has been used to create the initial pressure, cannot leak from the inlet element 9 Therefore, a "dry" expansion has been achieved.

The embodiment, shown by the FIGS. 2-5, represents a congruous apparatus, in which the axially acting force, however, is absorbed in a different manner. The cross-section of FIG. 3 shows, that the mold 4 consists of four shaped parts, which, after the insertion of the cams 2 and the spur gear 3, are held together by the casing 5.

In the second embodiment, the support 13, for the face of the container 12, is equipped with four lateral extensions 13a, which exhibit a dovetail-shaped profile according to FIG. 4. The parts of the mold have respective dovetail-shaped grooves, with which the parts of the mold may be slid onto the lateral extensions of the support, as demonstrated by the double-headed arrows in FIG. 3.

When the parts of the mold 4 are in the correct position, the casing 5 is slipped over the mold 4. The axial force, created between the support 13 and the mold 4, is absorbed by the lateral extensions 13a.

An equivalent connection is also achieved between the inlet element 9 and the upper part of the multi-divided mold 4. The inlet element 9 is also equipped with lateral extensions 9a which exhibit a dovetail-shaped cross-section according to FIG. 5. When closing the mold 4 after the insertion of the parts 2 and 3, which are to be fastened, the parts of the mold 4, which are equipped with respective grooves, are slid onto the extensions 9a. In the embodiment according to FIG. 2, additional fastening clamps and hooks are therefore dispensable.

The present invention is, of course, in no way restricted to the specific disclosure of the specification, examples and drawings, but also encompasses any modifications within the scope of the appended claims.

What we claim is:

1. An apparatus for exact positioning and fastening of several parts, which have an opening, onto a hollow body by expanding said hollow body with a hydraulic fluid, whereby, in the initial state, said opening of said parts, which are to be fastened, is larger than dimensions of fastening positions of said hollow body, said parts are placed into depressions of a mold, which comprises at least two parts, then said fastening positions of said hollow body are positioned into said openings of said parts, and said at least two parts of said mold are aligned and held in place by an enclosing casing; and said mold has an inlet element attached to one end thereof; said apparatus comprising:

an expandable elastic container connected with one end thereof to said inlet element, which inlet element adjoins one end of said hollow body; with said container, which contains the hydraulic medium, being disposed in said hollow body such that a free end of said container remote from said inlet element is supported by a support; with said support being connected to said mold at an end of said hollow body opposite said inlet element; whereby said hollow body is expanded by applying pressure to the hydraulic medium in said container.

2. An apparatus according to clam 1, in which said support, together with said parts of said mold, is contained in said casing; and which apparatus includes means for form-locking said casing with said inlet element after said inlet element is attached.

3. An apparatus according to claim 2, in which said inlet element is connected to said casing by a U-shaped clamp.

4. An apparatus according to claim 2, in which said inlet element is connected to said casing by at least one pivoting hook attached to said inlet element.

5. An apparatus according to claim 2, in which said inlet element is connected to said casing by at least one pivoting hook attached to said casing.

6. An apparatus according to claim 1, in which said support is form-locked with said mold.

7. An apparatus according to claim 6, in which said support is provided with lateral extensions, which are form-locked with said mold.

8. An apparatus according to claim 7 in which said extensions of said support are formed in a dovetail profile, onto which extensions the axially separated parts of said mold are slid with respective grooves.

9. An apparatus according to claim 1, in which said inlet element is form-locked with said mold.

10. An apparatus according to claim 9, in which said inlet element is provided with lateral extensions, which are form-locked with said mold.

11. An apparatus according to claim 10, in which said extensions of said inlet element are formed in a dovetail profile, onto which extensions the axially separated parts of said mold are slid with respective grooves.

12. An apparatus according to claim 1, in which said container is attached in a fluid and pressure tight manner to said inlet element by a holding collar, screwed onto said inlet element.

13. An apparatus according to claim 1, in which said container is made of an elastomer.

* * * * *